2,890,236
PHOSPHORIC ACID ESTER INSECTICIDES

Richard Sehring and Karl Zeile, Ingelheim, Germany, assignors to C. H. Boehringer Sohn, Ingelheim, Germany, a partnership of Germany No Drawing. Application March 15, 1957
Serial No. 646,198

9 Claims. (Cl. 260—461)

The present invention relates to novel phosphoric acid compounds and their use as insecticides in combating animal pests, especially flies and mites.

It is already known that O,O,dialkyl-2,2-dichlorovinyl phosphates, which are produced by condensation of trialkylphosphites with chloral, possess certain insecticidal properties. However, these known phosphoric acid esters, when used alone or as active ingredients in insecticidal compositions, have the disadvantage that they are very volatile and that they exhibit a considerable toxicity toward warm-blooded animals.

We have found that heretofore unknown phosphoric acid compounds of the general formula

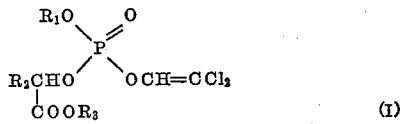

wherein $R_1$ is a methyl or ethyl radical, $R_2$ is hydrogen or a methyl or ethyl radical and $R_3$ is hydrogen or a straight-chain or branched-chain saturated or unsaturated aliphatic radical with 1 to 8 carbon atoms, represent active agents with considerably increased insecticidal effectiveness over the known O,O-dialkyl-2,2-dichlorovinyl phosphates.

The novel phosphoric acid esters wherein $R_3$ is aliphatic with 1 to 8 carbon atoms may be obtained by the reaction of phosphites of the general formula

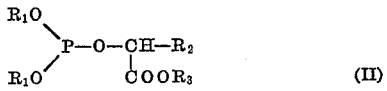

wherein $R_1$ and $R_2$ have the meaning above indicated and $R_3$ is an aliphatic radical with 1 to 8 carbon atoms, with chloral. The dialkyl-carbalkoxyalkyl-phosphites of the Formula II above are more reactive than the corresponding trialkyl phosphites, such as triethyl phosphites.

The condensation of the dialkyl-carbalkoxyalkyl-phosphites with chloral therefore takes place at temperatures between 0 and 20° C. Only by performing the condensation at temperatures within this range is it possible to obtain uniform products. In order to assure as mild reaction conditions as possible, it is advantageous to carry out the condensation in an inert solvent, such as ether, dioxan, benzene, toluene, or low boiling point gasolines. The performance of the condensation reaction at temperatures above 25° C. leads to uncontrollable rearrangements and partial decompositions accompanied by a strong blue discoloration of the reaction mixture. As a result of these uncontrollable side reactions, the reaction products become strongly toxic toward warm-blooded animals.

The novel phosphoric acid esters of the Formula I above wherein $R_3$ is hydrogen may be obtained by saponifying the phosphoric acid esters of the Formula I above wherein $R_3$ is an aliphatic radical with 1 to 8 carbon atoms. Especially good yields are obtained when the saponification is carried out with a teritiary amine, for example with triethylamine, in the presence of water in an inert organic solvent such as benzene, toluene, xylene or ether. After the saponification the reaction mixture may selectively be worked up to isolate the free acid or the corresponding salt of the acid.

The insecticidal phosphoric acid compounds produced in accordance with the present invention are marked by a particularly long period of effective action and, because of their low volatility, may also be used in the open without any appreciable decrease of the duration of their effective action. Moreover, they are less toxic with respect to warm-blooded animals than the known compounds of similar structure.

The insecticidal effect achieved in killing flies with the known O,O-diethyl-2,2-dichlorovinyl-phosphate is compared in the following table with the insecticidal effect achieved with the aid of the novel phosphoric acid esters according to the present invention.

TABLE

| | Compound | $LT_{95}$ |
|---|---|---|
| (Known Compound) | $\begin{array}{c} C_2H_5O \\ \phantom{C_2H_5O}\diagdown \\ \phantom{CCC}P \\ C_2H_5O \diagup \phantom{C}\diagdown OCH{=}CCl_2 \end{array}$ | 120 min. |
| (1) | $\begin{array}{c} CH_3O \\ \phantom{CH_3O}\diagdown \\ \phantom{CCC}P \\ CH_3{-}CHO \diagup \phantom{C}\diagdown OCH{=}CCl_2 \\ \phantom{CH_3{-}C}| \\ \phantom{CH_3{-}}COOC_2H_5 \end{array}$ | 64 min. |
| (2) | $\begin{array}{c} C_2H_5O \\ \phantom{C_2H_5O}\diagdown \\ \phantom{CCC}P \\ CH_3{-}CHO \diagup \phantom{C}\diagdown OCH{=}CCl_2 \\ \phantom{CH_3{-}C}| \\ \phantom{CH_3{-}}COOC_2H_5 \end{array}$ | 70 min. |
| (3) | $\begin{array}{c} C_2H_5O \\ \phantom{C_2H_5O}\diagdown \\ \phantom{CCC}P \\ HCHO \diagup \phantom{C}\diagdown OCH{=}CCl_2 \\ \phantom{HC}| \\ \phantom{H}COOC_4H_9 \end{array}$ | 160 min. |
| (4) | $\begin{array}{c} C_2H_5O \\ \phantom{C_2H_5O}\diagdown \\ \phantom{CCC}P \\ CH_3{-}CHO \diagup \phantom{C}\diagdown OCH{=}CCl_2 \\ \phantom{CH_3{-}C}| \\ \phantom{CH_3{-}}COOC_5H_{11} \end{array}$ | 150 min. |
| (5) | $\begin{array}{c} C_2H_5O \\ \phantom{C_2H_5O}\diagdown \\ \phantom{CCC}P \\ CH_3{-}CHO \diagup \phantom{C}\diagdown OCH{=}CCl_2 \\ \phantom{CH_3{-}C}| \\ \phantom{CH_3{-}}COOH \end{array}$ | 90 min. |
| (6) | $\begin{array}{c} CH_3O \\ \phantom{CH_3O}\diagdown \\ \phantom{CCC}P \\ CH_3{-}CHO \diagup \phantom{C}\diagdown OCH{=}CCl_2 \\ \phantom{CH_3{-}C}| \\ \phantom{CH_3{-}}COOH \end{array}$ | 95 min. |

In the above table the degree of effectiveness of the individual insecticidal compounds is expressed as $LT_{95}$, that is the period of time within which 95% of the flies were killed by equal amounts of the individual compounds. The experiments, the results of which are tabulated above, were carried out by saturating each of seven different pieces of filter paper with a 0.01% solution of one of the indicated phosphates in chloroform and subsequently drying the saturated papers for 24 hours at room temperature. The same number of flies were then placed on each paper.

The table indicates that some of the novel phosphates have a greater degree of effectiveness than the known compound. The degree of effectiveness of compounds 3 and 4 is admittedly less than that of the known compound but, as already pointed out, the novel phosphates are less volatile than the known phosphate and therefore have a greater duration of effective action; they also exhibit less toxicity toward warm-blooded animals.

The toxicity ($LD_{50}$) of O-($\alpha$-carboxyethyl-O-ethyl-O-2,2-dichlorovinyl)-phosphate and O-($\alpha$-carboxyethyl)-O-methyl-O-(2,2-dichlorovinyl)-phosphate was measured on white mice and found to be 95 (mg./kg. and 125 mg./kg. respectively. In contrast thereto, the toxicity of the known compound toward white mice is 50–60 mg./kg.

The following examples will further illustrate various methods of producing the phosphoric acid esters in accordance with the present invention.

*Example I*

*O-carbobutoxymethyl-O-methyl-O - (2,2-dichlorovinyl)-phosphate.*—32 gm. chloral, dissolved in 150 ml. ether, were added dropwise to a solution of 44.8 gm. carbobutoxymethyl-dimethyl-phosphite in 150 ml. ether, accompanied by thorough cooling and stirring. The temperature was not permitted to exceed 5° C. during that time. After all of the chloral solution had been added the reaction mixture was allowed to react for an additional hour at 15° C. Thereafter the ether and the small excess of chloral were distilled off in a vacuum, leaving 62 gm. of a colorless oil which could not be distilled without decomposition. The boiling point of the oil at 0.2 mm. Hg was 132–136° C. The calculated chlorine value was 22.1% and the chlorine value actually found was 22.0%.

*Example II*

*O-carbobutoxymethyl-O-ethyl-O - (2,2 - dichlorovinyl)-phosphate.*—32 gm. chloral, dissolved in 150 ml. ether, were added dropwise to a solution of 50.4 gm. carbobutoxymethyl-diethyl-phosphite in 150 ml. ether, accompanied by thorough cooling and stirring. The reaction temperature during this period was not permitted to exceed 5° C. After all of the chloral solution had been added, the reaction mixture was allowed to react for an additional hour at 15° C. Thereafter the ether and the small excess of chloral were removed by vacuum distillation. 70 gm. of a colorless oil remained behind which could not be distilled without decomposition. Its boiling point at 0.2 mm. Hg was 135–140° C.

*Example III*

*O-$\alpha$-carbethoxyethyl - O - ethyl-O-(2,2-dichlorovinyl)-phosphate.*—30 gm. chloral, dissolved in 100 ml. ether, were added dropwise to a solution of 42 gm. $\alpha$-carbethoxyethyl-dimethyl-phosphite in 120 ml. ether, accompanied by thorough cooling and stirring. The temperature was maintaining at 5° C. during that time. Thereafter the reaction mixture was allowed to react for an additional hour at 15° C. and subsequently the ether and traces of excess chloral were removed by vacuum distillation. The yield was 70 mm. of a colorless oil having a boiling point of 115–122° C. (decomposition) at 0.5 mm. Hg.

*Example IV*

*O-$\alpha$-carboamyloxyethyl-O-ethyl - O-(2,2-dichlorovinyl)-phosphate.*—56 gm. $\alpha$-carboamyloxyethyl - diethyl - phosphite were admixed in a round-bottomed flask with 150 ml. ether. The resulting mixture was cooled to 0° C. and a solution of 30 gm. chloral in 150 ml. ether was added dropwise, accompanied by stirring. The internal temperature of the reaction mixture was not permitted to exceed 5° C. during this period. After all of the chloral solution was added, the reaction mixture was heated to 15° C. and allowed to react for an additional hour. Subsequently, the ether was removed by vacuum distillation, leaving 72 gm. of a colorless oil which could not be distilled.

*Example V*

*O-$\alpha$-carbethoxyethyl-O-ethyl - O - (2,2 - dichlorovinyl)-phosphate.*—A solution of 32 gm. chloral in 150 ml. ether was added dropwise to a solution of 45.6 gm. $\alpha$-carbethoxyethyl-diethyl-phosphite in 150 ml. ether, accompanied by cooling and stirring. The reaction temperature was not permitted to exceed 5° C. during this time. After all of the chloral solution was added, the reaction mixture was allowed to react for an additional hour at 15° C. Thereafter, the ether was removed by vacuum distillation. 67 gm. of a colorless oil remained behind which decomposed considerably when distilled. Its boiling point at 0.7 mm. Hg was 134–137° C.

*Example VI*

*O-($\alpha$-carboxyethyl) - O - ethyl-O-(2,2-dichlorovinyl)-phosphate.*—64 gm. O-$\alpha$-carbethoxyethyl-O-ethyl-O-(2,2-dichlorovinyl)-phosphate were dissolved in 100 cc. toluene and the solution was admixed with 20.5 gm. triethylamine. 3.6 gm. water were added to this solution and the resulting reaction mixture was subsequently heated for one hour at 50–60° C. accompanied by stirring. The reaction mixture was allowed to cool to 0° C. whereupon gaseous hydrogen chloride was introduced until the precipitation of triethylamine hydrochloride was complete. The precipitated salt was separated and the toluene was removed by vacuum distillation. O-($\alpha$-carboxyethyl)-O-ethyl-O-(2,2-dichlorovinyl)-phosphate remained behind in the form of a light brown oil which could not be distilled. The yield was 55 gm., corresponding to 94% of theory.

*Example VII*

*Triethylamine salt of O-($\alpha$-carboxyethyl)-O-ethyl-O-(2,2-dichlorovinyl)-phosphate.*—64 gm. O-$\alpha$-carbethoxyethyl-O-ethyl-O-(2,2-dichlorovinyl)-phosphate were dissolved in 100 cc. toluene and the solution was admixed with 20.5 gm. triethylamine. 3.6 gm. water were added to the resulting solution and the reaction mixture was heated for one hour at 50–60° C. accompanied by stirring. Subsequently, the toluene was removed by vacuum distillation; a light brown oil remained behind.

*Example VIII*

*O - ($\alpha$ - carboxyethyl)-O-methyl-O-(2,2-dichlorovinyl)-phosphate.*—61 gm. O - $\alpha$ - carbethoxyethyl-O-methyl-O-(2,2-dichlorovinyl)-phosphate were dissolved in 100 cc. toluene and the solution was admixed with 20.5 gm. triethylamine. 3.6 gm. water were added to this solution and the reaction mixture was heated for one hour at 50–60° C accompanied by stirring. The reaction mixture was allowed to cool to 0° C. and thereafter gaseous hydrogen chloride was introduced until the precipitation of triethylamine hydrochloride was complete. The precipitated salt was separated from the solution and the toluene was removed by vacuum distillation. O-($\alpha$-carboxyethyl) - O - methyl - O - (2,2-dichlorovinyl)-phosphate remained behind in the form of a light brown oil which could not be distilled. The yield was 51 gm. which corresponds to 83% of theory.

*Example IX*

*O - ($\alpha$-carboxymethyl)-O-ethyl-O-(2,2-dichlorovinyl)-phosphate.*—61 gm. O-carbethoxymethyl-O-ethyl-O-(2,2-dichlorovinyl)- phosphate were dissolved in 100 ml. toluene and the resulting solution was admixed with 20.5 gm. triethylamine. 3.6 gm. water were added to this solution and the reaction mixture was subsequently heated for one hour at 50–60° C. accompanied by stirring. The reaction mixture was then allowed to cool to 0° C. and hydrogen chloride gas was introduced until the precipitation of triethylamine hydrochloride was complete. The precipitated salt was filtered off by suction filtration at —5° C. and the toluene was removed from the filtrate by vacuum distillation. O-(α-carboxymethyl)-O-ethyl-O-(2,2-dichlorovinyl)-phosphate remained behind in the form of a light brown oil which could not be distilled. The yield was 49.5 gm. which corresponds to 91% of theory.

The novel phosphoric acid ester compounds of the Formula I above disclosed may be used as insecticides either alone or in conjunction with gaseous, liquid or solid inert carriers customarily employed for the production of insecticidal compositions such as dusting powders, suspensions, emulsions, solutions, aerosols, ointments or fumigating paper.

The following examples will illustrate various methods of compounding such insecticidal compositions comprising the novel phosphoric acid compounds disclosed herein as active ingredients.

*Example X*

For the preparation of an emulsion 50 gm. of active ingredient and 50 gm. naphthalene sulphonate were emulsified in water so that the emulsion had an active ingredient content of 0.01 to 0.05%.

*Example XI*

For the preparation of a suspension 25 gm. active ingredient, 5 gm. naphthalene sulphonate and 70 gm. kaolin were milled together and the resulting mixture was suspended in water so that the active ingredient concentration of the aqueous suspension was 0.01–0.05%.

*Example XII*

For the preparation of a dusting powder 2 gm. of active ingredient with 98 parts by weight of kaolin or another solid carrier were milled until homogeneous.

*Example XIII*

For the production of aerosol 5 parts of active ingredient were dissolved in 95 parts of difluoro-dichloromethane.

While we have disclosed certain specific embodiments of the present invention, it will be apparent to those skilled in the art that the invention is not limited to these embodiments, and that various changes and modifications can be made without departing from the spirit of the invention or the scope of the appended claims.

We claim:

1. Phosphoric acid compounds having the structural formula

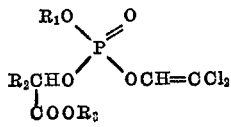

wherein $R_1$ is selected from the group consisting of methyl and ethyl, $R_2$ is selected from the group consisting of hydrogen, methyl and ethyl, and $R_3$ is selected from the group consisting of hydrogen and alkyl radicals with 1 to 8 carbon atoms.

2. O - (α-carboethoxyethyl)-O-methyl-O-(2,2-dichlorovinyl)-phosphate.

3. O - (α-carboethoxyethyl)-O-ethyl-O-(2,2-dichlorovinyl)-phosphate.

4. O - (α-carboamyloxyethyl)-O-ethyl-O-(2,2-dichlorovinyl)-phosphate.

5. O - (α-carboxyethyl)-O-ethyl-O-(2,2-dichlorovinyl)-phosphate.

6. O - (α - carboxyethyl)-O-methyl-O-(2,2-dichlorovinyl)-phosphate.

7. The method of producing phosphoric acid compounds having the structural formula

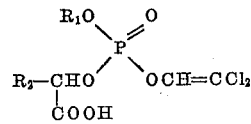

wherein $R_1$ is selected from the group consisting of methyl and ethyl, and $R_2$ is selected from the group consisting of hydrogen, methyl and ethyl, which comprises subjecting a phosphite having the structural formula

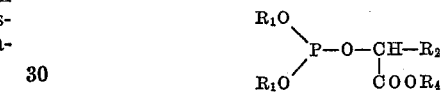

wherein $R_1$ and $R_2$ have the meaning indicated above and $R_4$ is alkyl with 1 to 8 carbon atoms, to a condensation reaction with chloral at temperatures below 25° C., saponifying the reaction product with a tertiary amine, and neutralizing the saponification product with a strong mineral acid.

8. The method of claim 7, wherein said tertiary amine is triethylamine.

9. The method of claim 7, wherein the condensation reaction is carried out in the presence of an inert organic solvent.

References Cited in the file of this patent

FOREIGN PATENTS 1,069,431    France _____ July 7, 1954

OTHER REFERENCES

Fieser et al.: Organic Chemistry, 1944, pp. 182, 226–227.
Science, July 3, 1953, vol. 118, pp. 28–29.
Science, September 30, 1955, vol. 122, pp. 597–598.
J.A.C.S., vol. 78, August 5, 1956, pp. 3715–3718 (received December 14, 1955).